United States Patent
Onigata

(10) Patent No.: US 10,138,979 B2
(45) Date of Patent: Nov. 27, 2018

(54) BALANCER DEVICE FOR AN INTERNAL COMBUSTION ENGINE

(71) Applicant: HITACHI AUTOMOTIVE SYSTEMS, LTD., Hitachinaka-shi, Ibaraki (JP)

(72) Inventor: Ryoji Onigata, Atsugi (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 66 days.

(21) Appl. No.: 14/850,340

(22) Filed: Sep. 10, 2015

(65) Prior Publication Data

US 2016/0258507 A1 Sep. 8, 2016

(30) Foreign Application Priority Data

Mar. 3, 2015 (JP) ................. 2015-040946

(51) Int. Cl.
| | |
|---|---|
| F02B 75/06 | (2006.01) |
| F01M 1/02 | (2006.01) |
| F02B 41/00 | (2006.01) |
| F16F 15/26 | (2006.01) |
| F02B 67/06 | (2006.01) |

(52) U.S. Cl.
CPC ............. *F16F 15/264* (2013.01); *F01M 1/02* (2013.01); *F16F 15/265* (2013.01); *F01M 2001/0238* (2013.01); *F01M 2001/0276* (2013.01); *F02B 67/06* (2013.01)

(58) Field of Classification Search
CPC ...... F16F 15/264; F16F 15/265; F16F 15/267; F01M 1/02; F01M 2001/0238; F01M 2001/0276; F01M 2001/0284; F02B 67/06; F16N 25/04
USPC .................... 123/192.2, 192.1, 196 R
See application file for complete search history.

(56) References Cited

U.S. PATENT DOCUMENTS

| | | | |
|---|---|---|---|
| 8,100,105 B2* | 1/2012 | Schober | F16F 15/264 |
| | | | 123/192.2 |
| 8,613,610 B2 | 12/2013 | Saga et al. | |
| 2004/0028537 A1* | 2/2004 | Shulver | F02B 67/04 |
| | | | 417/310 |
| 2005/0058553 A1* | 3/2005 | Takiguchi | F04C 2/10 |
| | | | 417/310 |
| 2009/0016907 A1* | 1/2009 | Williamson | F16F 15/265 |
| | | | 417/365 |
| 2012/0055447 A1* | 3/2012 | Yano | F02D 9/02 |
| | | | 123/400 |

FOREIGN PATENT DOCUMENTS

| | | |
|---|---|---|
| JP | 4665638 B2 | 4/2011 |
| JP | 2011-111926 A | 6/2011 |

* cited by examiner

*Primary Examiner* — Syed O Hasan
(74) *Attorney, Agent, or Firm* — Foley & Lardner LLP

(57) ABSTRACT

A balancer device for an internal combustion engine is provided, wherein the drive mechanism 8 and the oil pump 3 are arranged on the side opposite to driven balancer weight 135 in the axial direction of the driven balancer shaft 5.

17 Claims, 6 Drawing Sheets

BALANCER DEVICE FOR AN INTERNAL COMBUSTION ENGINE

TECHNICAL FIELD

The present invention relates to a balancer device for an internal combustion engine.

BACKGROUND ART

Japanese Patent No. 4665638 discloses a balancer device for an internal combustion engine connected to an oil pump. A torque from a crankshaft is input to a drive unit fixed to one end of a drive balancer shaft and transmitted to one end of a driven balancer shaft through a balancer drive gear and a balancer driven gear. The torque input to the driven balancer shaft is transmitted to the oil pump through a drive mechanism provided on the other end of the driven balancer shaft.

SUMMARY OF INVENTION

However, a problem in the conventional art is a large axial dimension of the device caused by an arrangement of the drive mechanism and the oil pump on the other end of the driven balancer shaft.

An object of the present invention is to provide a balancer device for an internal combustion engine, which can suppress an increase in the axial dimension of the device.

In the present invention, the drive mechanism and the oil pump are provided on the side opposite to the driven balancer weight in the axial direction of the driven balancer shaft.

Therefore, it is possible to suppress the increase in the axial dimension of the device.

DESCRIPTION OF EMBODIMENTS

[Embodiment 1]

Figure 1:
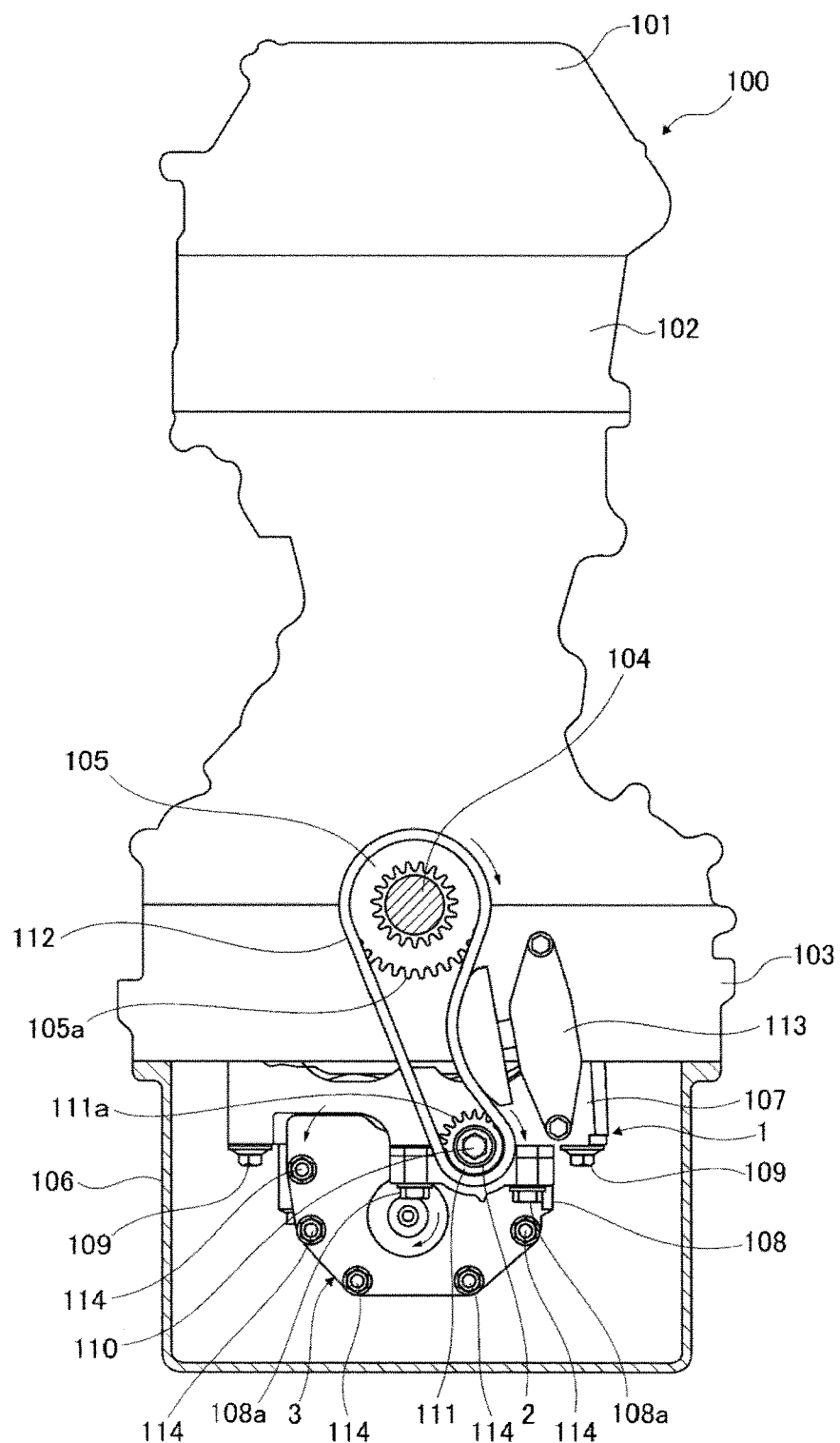
FIG. 1 is a front view of an engine 100 according to the first embodiment.

FIG. 1 is a front view of an engine 100 according to the first embodiment. The engine (internal combustion engine) 100 is, for example, a reciprocating in-line four cylinder engine. The engine 100 according to the first embodiment is mounted on a so-called front engine front drive vehicle (FF vehicle). A cylinder block 102 is provided on a lower portion of a cylinder head 101. A ladder frame 103 is fixed to a lower surface of the cylinder block 102. A crankshaft 104 is rotationally supported on the ladder frame 103. The crankshaft 104 is axially arranged along the longitudinal direction (front-rear direction) of the engine. The engine 100 is mounted on a vehicle, so that the crankshaft 104 is arranged transversely to the longitudinal direction of the vehicle body. A crank sprocket 105 is fixed on one axial end of the crankshaft 104 (front side of the engine 100). A gear teeth portion 105a is formed on the outer periphery of the crank sprocket 105. An oil pan 106 for storing engine oil is mounted on the lower part of the ladder frame 103. A balancer device 1 for suppressing secondary vibration of the engine 100 is received in the oil pan 106.

The balancer device 1 comprises an upper housing 107, a lower housing 108, a drive unit 2 and an oil pump 3. The upper housing 107 and the lower housing 108 are fixed to the lower surface of the ladder frame 103 by a plurality of balancer fastening bolts 109 in an overlapping state in the vertical direction. The rotational force from the crank shaft 104 is transmitted to the drive unit 2. A balancer sprocket (chain drive) 111 is fixed to the drive unit 2 by sprocket fastening bolts 110. A gear teeth portion 111a is formed on the outer circumference of the balancer sprocket 111. The number of the gear teeth portion 111a is set to be half the number of teeth of the gear teeth portion 105a. A drive chain 112 is wound between the balancer sprocket 111 and the crank sprocket 105. The torque (the rotational force) from the crankshaft 104 is transmitted to the drive unit 2 through the drive chain 112. A certain tension is applied to the drive chain 112 by a hydraulic tensioner 113 at all times. The tensioner 113 is supported on the ladder frame 103 and the upper housing 107. In the first embodiment, the drive unit 2 is formed as a chain drive, so that the rotational speed of the crankshaft 104 can be changed and transmitted to the drive unit 2 located at a distance. Furthermore, a chain drive is advantageous in size reduction as compared to a gear drive. The oil pump 3 is connected to the balancer device 1. The oil pump 3 is a variable displacement oil pump for varying the amount of volume change in the pump chamber in response to a predetermined state. The variable displacement oil pump in the first embodiment is a vane pump having a mechanism for reducing the amount of the volume change in the pump chamber during high speed rotation of the pump. For example, the known vane pump disclosed in Japanese published patent application No. 2011-111926 is used. The oil pump 3 is fixed to the front side of the lower housing 108 by a plurality of oil pump fastening bolts 114. Since the oil pump 3 is mounted on the lower housing 108, high support rigidity can be obtained.

Figure 2:
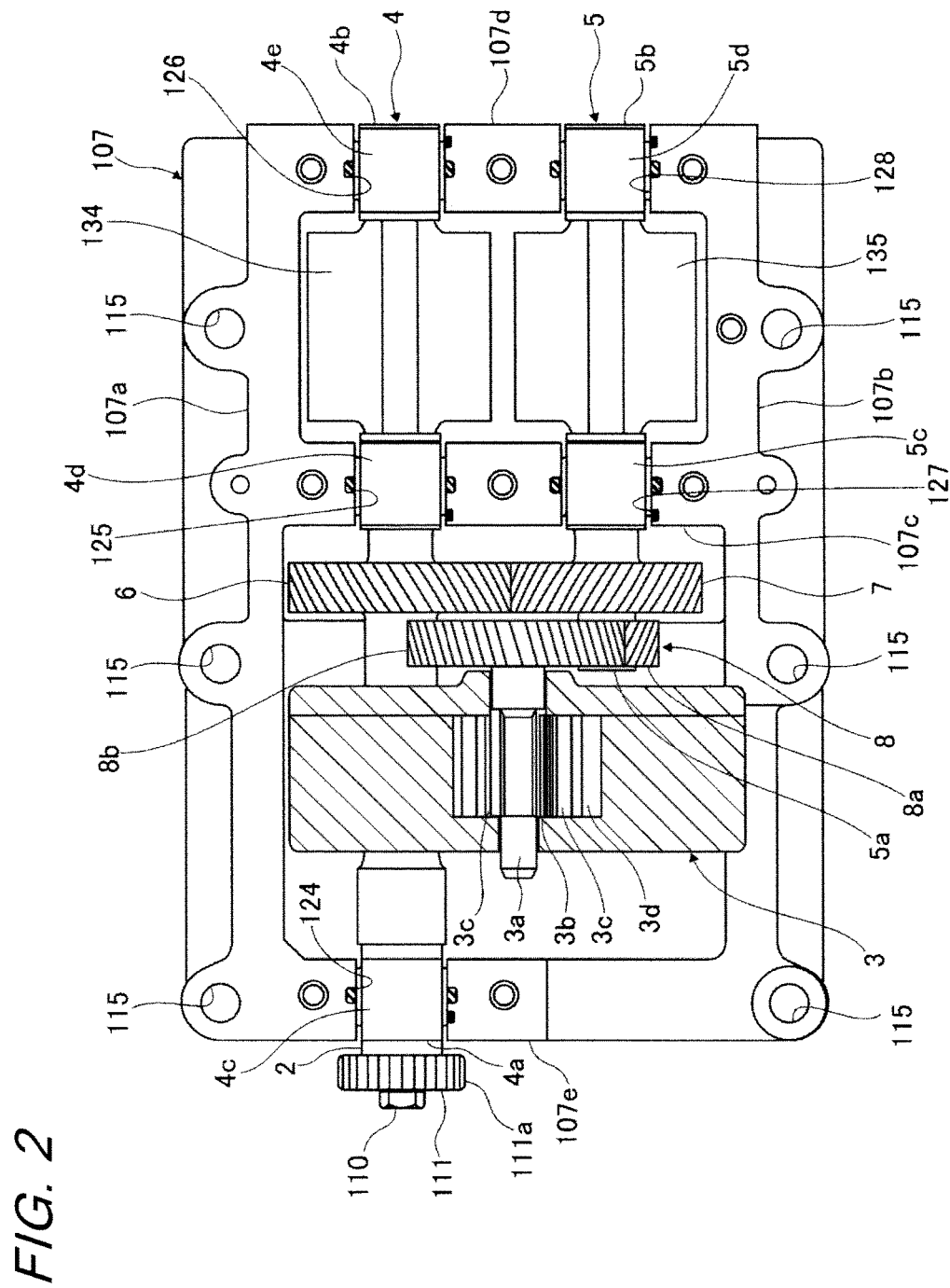
FIG. 2 is a bottom view of an upper housing 107 in a balancer device 1 according to the first embodiment.

FIG. 2 is a bottom view of the upper housing 107 of the balancer device 1 according to the first embodiment. In addition to the upper housing 107, the lower housing 108, the drive unit 2 and the oil pump 3, the balancer device 1 comprises a drive balancer shaft 4, a driven balancer shaft 5, a balancer drive gear 6, a balancer driven gear 7 and a drive mechanism 8. The upper housing 107 and the lower housing 108 are formed as a substantially half part and receive the drive balancer shaft 4, the driven balancer shaft 5, the balancer drive gear 6 and the balancer driven gear 7. On an outer peripheral part on which the upper housing 107 is connected with the lower housing 108, the upper housing 107 comprises a pair of left and right frame-like deck sections 107a, 107b extending in the longitudinal direction of the engine. The upper housing 107 comprises a pair of cross beam deck sections 107c, 107d arranged in the longitudinal direction to each other and connecting both the frame-like deck sections 107a, 107b in the traverse direction. The lower housing 108 also comprises similar frame-like deck sections and cross beam deck sections (not shown). The balancer fastening bolts 109 are inserted in bolt holes 115 which are formed in a predetermined position on the outer right and left sides and on the front end of the frame-like deck sections 107a, 107b of the upper housing 107. The balancer fastening bolts 109 are also inserted in bolt holes (not shown) formed in the lower housing 108 in a position corresponding to the bolt holes 115. The left frame-like deck section 107a of the upper housing 107 is formed longer than the right frame-like deck section 107b on the engine front side. A first cross beam deck section 107e is formed integrally with the front end of the left frame-like deck section 107a. The first cross beam deck section 107e is in parallel with the second cross beam deck section 107c and the third cross beam deck section 107d, and is formed shorter than the second cross beam deck section 107c and the third cross beam deck section 107d.

The drive balancer shaft 4 and the driven balancer shaft 5 are rotationally supported between the upper housing 107 and lower housing 108. The drive balancer shaft 4 and the driven balancer shaft 5 are axially arranged in parallel with each other along the longitudinal direction of the engine. The drive unit 2 is provided on a first end 4a which forms one end of the drive balancer shaft 4 in the axial direction. A cylindrical journal portion 4c, 4d, 4e is formed on the first end 4a, a central part, and a second end 4b which forms the other side (the engine rear side) of the drive balancer shaft 4. The first journal portion 4c is supported by the upper housing 107 through a two-piece plain bearing (not shown). The second journal portion 4d and the third journal portion 4e are supported between the upper housing 107 and lower housing 108 through a two-piece plain bearing (not shown). Cylindrical journal portions 5c, 5d are formed near a first end 5a on the one side and on a second end 5b on the other side of the driven balancer shaft 5 in the axial direction. The first journal portions 5c and the second journal portion 5d are supported between the upper housing 107 and the lower housing 108 through the two-piece plain bearing (not shown). The first journal portion 5c is arranged in the same position as the second journal portion 4d of the drive balancer shaft 4 in the longitudinal direction of the engine. The second journal portion 5d is arranged in the same position as the third journal portion 4e of the drive balancer shaft 4 in the longitudinal direction of the engine.

Each cross beam deck section 107e, 107c, 107d of the upper housing 107 comprises a semicircular bearing groove 124, 125, 126, 127, 128 for attachment of an upper part of each two-piece plain bearing. Each cross beam deck section of the lower housing 108 comprises a semicircular bearing groove (not shown) for attachment of a lower part of each two-piece plain bearing. Between the second journal portion 4d and the third journal portion 4e in the axial direction of the drive balancer shaft 4, a semi-cylindrical drive balancer weight 134 is integrated with the drive balancer shaft 4. Between the first journal portion 5c and the second journal portion 5d in the axial direction of the driven balancer shaft 5, a semi-cylindrical driven balancer weight 135 is integrated with the driven balancer shaft 5. The drive balancer shaft 4 is press-fitted into the balancer drive gear 6. The balancer drive gear 6 is arranged near the first journal portion 4c between the first journal portion 4c and the second journal portion 4d. The balancer drive gear 6 is a helical gear. The axial length of the driven balancer shaft 5 is formed to be shorter than the drive balancer shaft 4. The balancer driven gear 7 engaged with the balancer drive gear 6 is press-fitted to the driven balancer shaft 5 near the first end 5a and between the first end 5a and the first journal portion 5c. The balancer driven gear 7 is a helical gear. Both gears 6 and 7 are provided with the same number of teeth. A helical gear is used for the both gears 6, 7, so that it is possible to realize quietness in spite of a high speed and high load.

Figure 3:
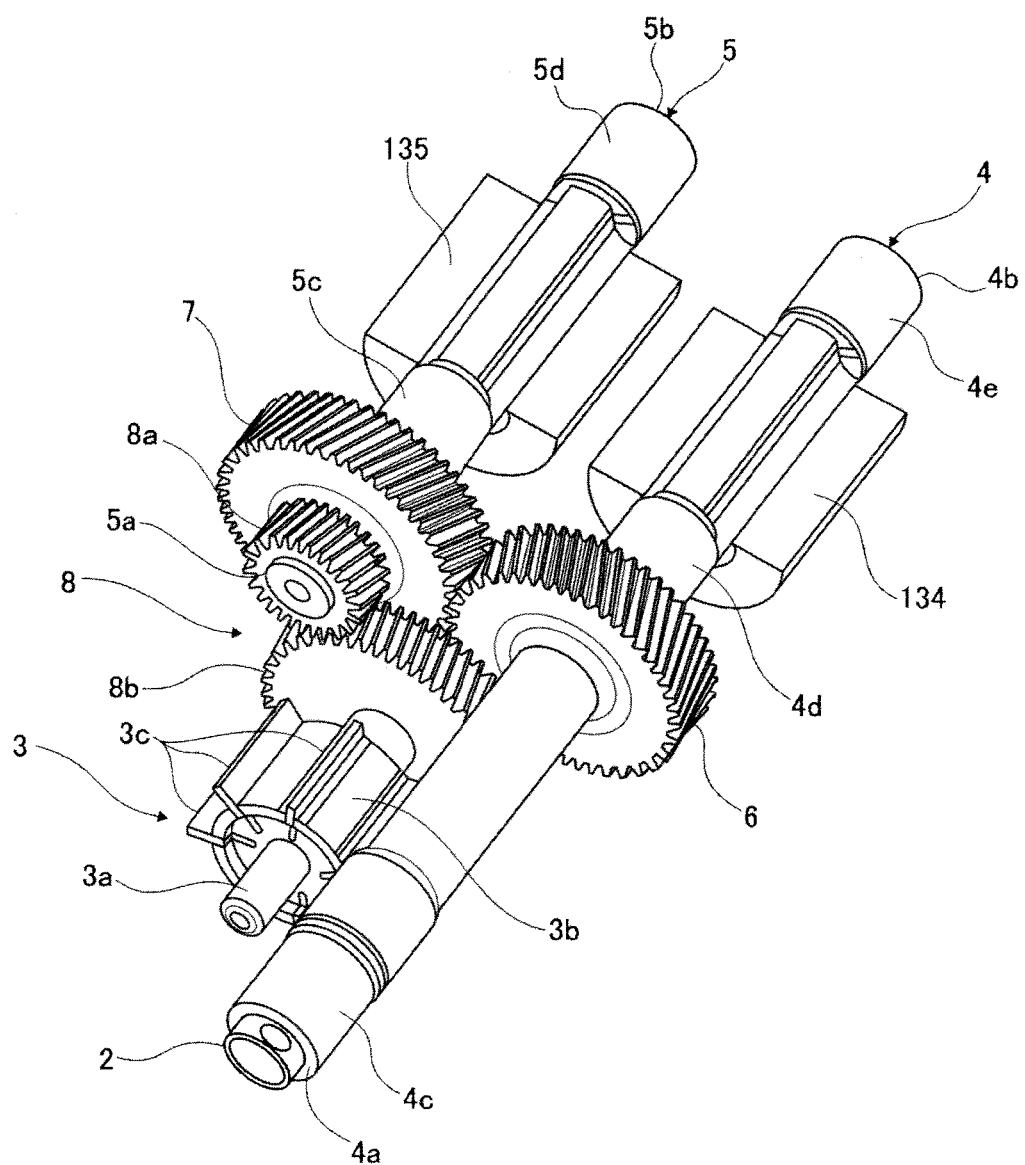
FIG. 3 is a perspective top view of a drive balancer shaft 4, a driven balancer shaft 5, a balancer drive gear 6, a balancer driven gear 7, an oil pump drive gear 8a and an oil pump driven gear 8b according to the first embodiment.

The oil pump 3 is connected to the first end 5a of the driven balancer shaft 5 through the drive mechanism 8. The drive mechanism 8 comprises an oil pump drive gear 8a and an oil pump driven gear 8b. The oil pump drive gear 8a and the oil pump driven gear 8b are helical gears engaged with each other. A helical gear is used for both gears 8a and 8b, so that it is possible to realize quietness in spite of a high speed and high load. The number of the teeth $N_A$ provided on the oil pump drive gear 8a is set to half of the number of teeth $N_B$ provided on the oil pump driven gear 8b. The first end 5a of the driven balancer shaft 5 is press-fitted into the oil pump drive gear 8a. An oil pump drive shaft 3a of the oil pump 3 is press-fitted into the oil pump driven gear 8b and a rotor 3b. The rotor 3b is arranged on the engine front side with respect to the oil pump driven gear 8b. Vanes 3c are retractably arranged on an outer periphery of the rotor 3b. A cam ring 3d is arranged on an outer peripheral side of the vanes 3c. As shown in FIG. 3, the oil pump 3 is disposed in a space between the drive unit 2 and the oil pump driven gear 8b in the axial direction of the drive balancer shaft 4. The oil pump 3 absorbs the oil stored in the oil pan 106 and discharges to a main oil gallery (not shown). The oil supplied to the main oil gallery is mainly used to lubricate each sliding part of the engine 100. A part of the oil supplied to the main oil gallery is supplied from the oil passage (not shown) formed in the lower housing 108 to each two-piece plain bearing and the oil supply chamber through an oil groove (not shown) formed in the upper housing 107 and lower housing 108. Furthermore, a part of the oil supplied to the two-piece plain bearing is used to lubricate balancer drive gear 6, the balancer driven gear 7, the oil pump drive gear 8a and the oil pump driven gear 8b, and then scraped out by each gear 6, 7, 8a, 8b, so that it is scattered and discharged from the oil discharge gap (not shown) formed in the upper housing 107. The oil supplied to the oil supply chamber is used to generate pressing force of the tensioner 113.

Figure 4:
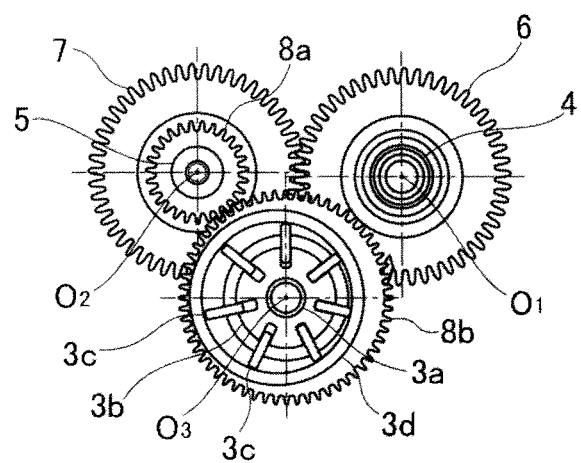
FIG. 4 is a front view of the drive balancer shaft 4, the driven balancer shaft 5 and an oil pump drive shaft 3a according to the first embodiment.

FIG. 4 is a front view of the drive balancer shaft 4, the driven balancer shaft 5, and the oil pump drive shaft 3a according to the first embodiment. The rotational center $O_1$ of the drive balancer shaft 4 and the rotational center $O_2$ of the driven balancer shaft 5 are arranged in the same position in the vertical direction. The rotational center $O_3$ of the oil pump drive shaft 3a is arranged below the rotational center $O_1$, $O_2$ of the drive balancer shaft 4 and the driven balancer shaft 5. Further, the rotational center $O_3$ of the oil pump drive shaft 3a is disposed between the rotational center $O_1$ of the drive balancer shaft 4 and the rotational center $O_2$ of the driven balancer shaft 5 in the lateral direction of the engine. In other words, in a direction perpendicular to the axis of the driven balancer shaft 5, the oil pump driven gear

8b is arranged on the side of the drive balancer shaft 4 with respect to the driven balancer shaft 5.

In the balancer device 1 according to the first embodiment, when the engine 100 is started and a crankshaft 104 is driven to rotate, the drive balancer shaft 4 rotates twice as fast as the crankshaft 104 through the crank sprockets 105, the drive chain 112 and the balancer sprocket 111. The driven balancer shaft 5 rotates in the opposite direction to the drive balancer shaft 4 at the same speed through the rotation transmitted by the engagement of the balancer drive gear 6 and the balancer driven gear 7. As a result, the drive balancer weight 134 and the driven balancer weight 135 also rotate in the opposite direction to each other, so that the left and right centrifugal forces of the drive balancer shaft 4 and driven balancer shaft 5 are cancelled each other. In this way, along with the rotation of the drive balancer shaft 4 and the driven balancer shaft 5, the drive balancer weight 134 and the driven balancer weight 135 are rotated to transmit an excitation force to the engine 100, so that the secondary vibration of the engine 100 can be suppressed.

[Suppression of Increase in Axial Dimension]

In a balancer device for an engine, the position of the drive unit into which torque is inputted from the crankshaft, and the position of both balancer weights for generating the excitation force are determined dependent on the engine parts layout and the positional relationship with other parts. Therefore, the length from the drive unit of the drive balancer shaft to the drive balancer weights is dependent on the position of the drive unit and the drive balancer weight. Although the balancer drive gear is arranged between the drive unit and the drive balancer weight in the conventional balancer device, a region on the side of the driven balancer shaft between the drive unit and the balancer drive gear in the axial direction is not effectively utilized and remains a dead space.

In contrast, in the balancer apparatus 1 according to the first embodiment, the oil pump drive gear 8a of the drive mechanism 8 is arranged on the side of the first end 5a with respect to the balancer driven gear 7 in the axial direction of the driven balancer shaft 5. Thereby, an increase in the axial dimension of the device can be suppressed as compared with the oil pump drive gear 8a arranged in other positions, since the space that is conventionally a dead space can be effectively utilized to arrange the drive mechanism 8. Furthermore, the oil pump 3 is disposed between the drive unit 2 and the oil pump driven gear 8b in the axial direction of the drive balancer shaft 4. That is, the oil pump 3 is received in the space that is conventionally a dead space, so that it is possible to shorten the axial dimension of the whole device including the oil pump 3.

[Reduction of Engaging Sound]

In the balancer device 1 according to the first embodiment, the balancer drive gear 6, the balancer driven gear 7 and the oil pump drive gear 8a are arranged on the side of the drive unit 2 with respect to the drive balancer weight 134 in the axial direction of the drive balancer shaft 4. Therefore, as compared with the conventional balancer device with the oil pump drive gear arranged on the side opposite to the drive unit with respect to the drive balancer weight, the torque transmission path from the drive unit 2 to the oil pump drive gear 8a can be shortened. Torsion torque load acting between the tooth surfaces of the oil pump drive gear 8a and the oil pump driven gear 8b is proportional to the torque transmission path length in the drive balancer shaft 4 and the driven balancer shaft 5. In other words, the torsion torque can be reduced in the balancer device 1 according to the first embodiment as compared with the conventional balancer device. A reduction of engaging sound of the oil pump drive gear 8a and the oil pump driven gear 8b can be realized, accordingly.

[Partition Wall Sharing by Aggregated Gear Arrangement]

The lower portion of the lower housing 108 is immersed at all times in the oil stored in the oil pan 106. Each gear 6, 7, 8a, 8b has to be isolated from the oil surface to suppress an occurrence of aeration associated with the agitation of the oil. According to the first embodiment, gears 6, 7, 8a, 8b are aggregated between the first cross beam deck section of the lower housing 108 and the mounting position of the oil pump 3. In the conventional balancer device, the balancer drive gear and the balancer driven gear on one hand, and the oil pump drive gear and the oil pump driven gear on the other hand are spaced apart from each other. For this reason, a partition wall to isolate the balancer drive gear and the balancer driven gear from the oil surface, and a partition wall to isolate the oil pump drive gear and the oil pump driven gear from the oil surface are required. In contrast, according to the first embodiment, the gears 6, 7, 8a, 8b are aggregated in one place, so that the number of the partition walls necessary for the lower housing 108 can be reduced as compared with the conventional balancer device. As a result, it is possible to reduce the number of partition walls required to realize a weight reduction of the device. Moreover, it is possible to reduce the axial dimension of the device by sharing axial partition walls. In addition, in the lower housing 108 of the first embodiment, one axial side of the gears 6, 7, 8a, 8b (engine front side) is closed by (the housing of) the oil pump 3 and isolated from the oil surface. In other words, the oil pump 3 functions as a part of the partition wall isolating the gears 6, 7, 8a, 8b from the oil surface. Therefore, due to the oil pump 3 functioning as the partition wall of the lower housing 108, it is possible to further reduce the number of partition walls to realize the lightweight of the device.

[Oil Pump Drive at Reduced Speed]

In the first embodiment, a variable displacement pump is used as the oil pump 3. The rotational speed of the variable displacement pump is preferably low, since the original purpose of the pump is to achieve an improvement in fuel consumption by suppressing the discharge flow rate at high rotational speed of the engine. In general, driving at a low rotational speed is advantageous in terms of the fuel consumption, since the friction of the oil pump is small at the low rotational speed and large at a high rotational speed. In the drive mechanism 8 according to the embodiment 1, the teeth number NA of the oil pump drive gear 8a is set to be half the teeth number NB of the oil pump driven gear 8b. Therefore, the rotational speed of the oil pump drive shaft 3a is reduced to ½ with respect to the rotational speed of the driven balancer shaft 5. Accordingly, the oil pump 30 can be driven at a relatively low rotational speed, so that the deterioration of fuel consumption can be suppressed.

In the first embodiment, the following effects can be achieved.

(1) A balancer device comprising:

a drive unit 2 to which a rotational force is transmitted from a crankshaft 104, a drive balancer shaft 4 having a drive balancer weight 134 rotated integrally with the drive unit 2, a balancer drive gear 6 arranged on the same side as the drive unit 2 with reference to the position of the drive side balancer weight 134 in the axial direction of the drive side balancer shaft 4, and rotated integrally with the drive balancer shaft 4, a balancer driven gear 7 engaged with the balancer drive gear 6, a driven balancer shaft 5 rotated integrally with the balancer driven gear 7 and having a driven balancer weight 135 provided on the same side as the drive balancer weight 134 in the axial direction, a drive mechanism 8 having a gear on the side opposite to the driven balancer weight 135 in the axial direction of the driven balancer shaft 5, wherein the rotational force is transmitted to the drive mechanism 8 from one of the balancer shafts 4, 5, and an oil pump 3 driven through the drive mechanism 8.

The space that is conventionally a dead space can be effectively utilized to arrange the drive mechanism 8, so that an increase in the axial dimension of the device can be suppressed. Moreover, it is possible to shorten the torque transmission path length leading to the drive mechanism 8 from the drive unit 2, so that a reduction in engagement noise between gears of the drive mechanism 8 can be realized.

(2) The balancer device for the internal combustion engine according to (1), wherein the drive mechanism 8 comprises an oil pump drive gear 8a provided on the driven balancer shaft 5 and an oil pump driven gear 8b engaged with the oil pump drive gear 8a.

The space that is conventionally a dead space can be effectively utilized to arrange the oil pump drive gear 8a and the oil pump driven gear 8b, so that an increase in the axial dimension of the device can be suppressed. Moreover, it is possible to shorten the torque transmission path length leading to the oil pump driven gear 8b from the drive unit 2, so that a reduction in engagement noise between the oil pump drive gear 8a and the oil pump driven gear 8b can be realized. Furthermore, the gears 6, 7, 8a, 8b are aggregated in one place, so that the number of the partition walls necessary for the lower housing 108 can be reduced and weight reduction of the device can be realized.

(3) The balancer device for the internal combustion engine according to (2), wherein the oil pump driven gear 8b is arranged on the side of the drive balancer shaft 4 in a direction perpendicular to the axis of the driven balancer shaft 5.

Therefore, the arrangement space in a direction perpendicular to the axis of the driven balancer shaft 5 can be reduced, so that it is possible to realize a compact device.

(4) The balancer device for the internal combustion engine according to (3), wherein an oil pump drive shaft 3a provided on the oil pump driven gear 8b and rotated integrally with the oil pump driven gear 8b is disposed between the drive balancer shaft 4 and driven balancer shaft 5 in a direction perpendicular to the axis of the drive balancer shaft 4.

Therefore, the arrangement space in the direction perpendicular to the axis of the drive balancer shaft 4 can be reduced, so that it is possible to realize a compact device.

(5) The balancer device for the internal combustion engine according to (4), wherein the oil pump 3 is disposed between the drive unit 2 and the oil pump driven gear 8b in the axial direction of the drive balancer shaft 4.

Therefore, the oil pump 3 is received in the space that is conventionally a dead space, so that it is possible to shorten the axial dimension of the whole device including the oil pump 3.

(15) A balancer device for an internal combustion engine comprising;

a housing (upper housing 107, lower housing 108) attached to the internal combustion engine (engine 100), a drive balancer shaft 4 rotationally received in the housing and having a drive side balancer weight 134, a chain drive unit (balancer sprocket 111) provided on one end (a first end 4a) of the drive balancer shaft 4, wherein a rotational force is transmitted to the chain drive unit from the crankshaft 104 through a drive chain 112, a balancer drive gear 6 provided between the drive balancer weight 134 and the chain drive unit in the axial direction of the drive balancer shaft 4 and rotated integrally with the drive balancer shaft 4, a balancer driven gear 7 engaged with the balancer drive gear 6, a driven balancer shaft 5 rotated integrally with the balancer driven gear 7, wherein the driven balancer shaft 5 is received in the housing and has a driven balancer weight 135 provided on the same side as the drive balancer weight 134 in the axial direction, an oil pump drive gear 8a provided on the side opposite to the driven balancer weight 135 in the axial direction of the driven balancer shaft 5 and rotated integrally with the driven balancer shaft 5, an oil pump driven gear 8b engaged with the oil pump drive gear 8a, and an oil pump 3 driven by an oil pump driven gear 8b.

Therefore, the space that is conventionally a dead space can be effectively utilized to arrange an oil pump drive gear 8a and the oil pump driven gear 8b, so that an increase in the axial dimension of the device can be suppressed. Moreover, it is possible to shorten the torque transmission path length leading to the oil pump drive gear 8a from the drive unit 2, so that a reduction in engaging noise between the oil pump drive gear 8a and the oil pump driven gear 8b can be realized. Furthermore, the gears 6, 7, 8a, 8b are aggregated in one place, so that it is possible to reduce the number of partition walls required to realize a weight reduction of the device.

(16) The balancer device for the internal combustion engine, according to (15), wherein the oil pump 3 is attached to the housing (lower housing 108).

Therefore, high support rigidity for the oil pump 3 is achieved. Further, the oil pump 3 functions as a partition for isolating each gear 6, 7, 8a, 8b from the oil surface, so that it is possible to reduce the number of the partition walls for the lower housing 108 and to realize size reduction of the device.

(17) The balancer device for the internal combustion engine, according to (16), wherein the oil pump 3 is disposed between the chain drive unit and the oil pump driven gear 8b in the axial direction of the drive balancer shaft 4.

Therefore, the oil pump 3 can be received in the space that is conventionally a dead space, so that it is possible to shorten the axial dimension of the whole device including the oil pump 3.

[Embodiment 2]

Figure 5:
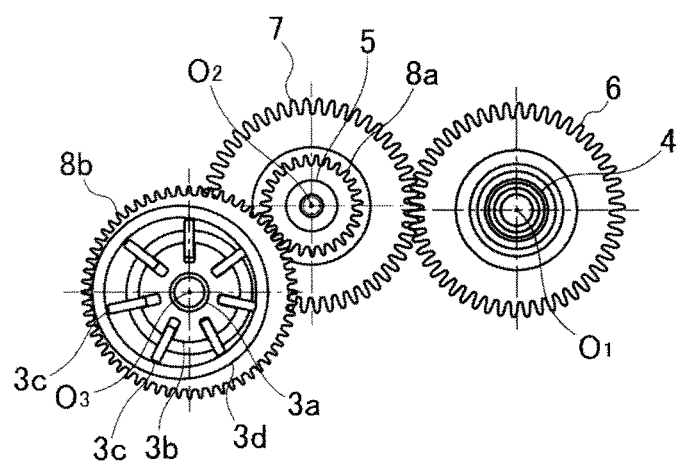
FIG. 5 is a front view of the drive balancer shaft 4, the driven balancer shaft 5 and the oil pump drive shaft 3a according to the second embodiment.

The second embodiment is now described only with respect to the points which are different from the first embodiment, since it has the same basic structure as the first embodiment. FIG. 5 is a front view of the drive balancer shaft 4, the driven balancer shaft 5 and the oil pump drive shaft 3a according to the second embodiment. According to the second embodiment, in the direction perpendicular to the axis of the driven balancer shaft 5, the rotational center $O_3$ of the oil pump drive shaft 3a is located on the side opposite to the rotation center $O_1$ of the drive balancer shaft 4 with respect to the rotation center $O_2$ of the driven balancer shaft 5. In other words, the oil pump driven gear 8b is provided on the side opposite to the drive balancer shaft 4 in the direction perpendicular to the axis of the driven balancer shaft 5.

According to the second embodiment, the following effects can be achieved.

(6) The balancer device for the internal combustion engine according to (2), wherein the oil pump driven gear 8b is provided on the side opposite to the drive balancer shaft 4 in the direction perpendicular to the axis of the driven balancer shaft 5.

Therefore, the oil pump 3 can be arranged on the side opposite to the drive balancer shaft 4 with respect to the driven balancer shaft 5.

[Embodiment 3]

Figure 6:
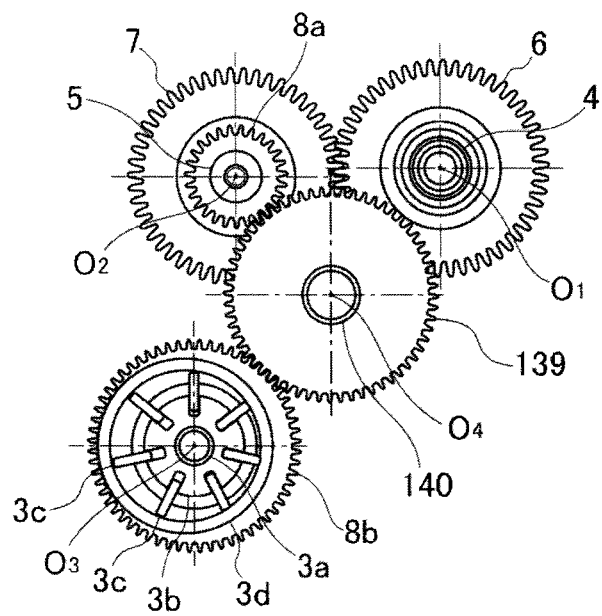
FIG. 6 is a front view of the drive balancer shaft 4, the driven balancer shaft 5, an intermediate gear shaft 140 and the oil pump drive shaft 3a according to the third embodiment.

The third embodiment is now described only with respect to the points which are different from the first embodiment, since it has the same basic structure as the first embodiment. FIG. 6 is a front view of the drive balancer shaft 4, the driven balancer shaft 5, the intermediate gear shaft 140 and the oil pump drive shaft 3a according to the third embodiment. The drive mechanism 8 according to the third embodiment comprises an intermediate gear 139 in addition to the oil pump drive gear 8a and the oil pump driven gear 8b. The intermediate gear 139 is a helical gear engaged with the oil pump drive gear 8a and the oil pump driven gear 8b. The intermediate gear 139 is fixed to the intermediate gear axis 140. The intermediate gear shaft 140 is rotationally supported with respect to the lower housing 108. A rotational center $O_4$ of the intermediate gear shaft 140 is located below the rotational center $O_1$, $O_2$ of the drive balancer shaft 4 and the driven balancer shaft 5, and above the oil pump driven gear 8b. The rotational center $O_4$ of the intermediate gear shaft 140 is disposed between the rotational center $O_2$ of the driven balancer shaft 5 and the rotational center $O_1$ of drive balancer shaft 4 in the lateral direction of the engine.

The number of teeth of the oil pump drive gear 8a, the oil pump driven gear 8b and the intermediate gear 139 is configured such that the total speed reduction ratio of the drive mechanism 8 corresponds to the speed reduction ratio (=2) of the drive mechanism 8 according to the first embodiment. In the drive mechanism 8 according to the third embodiment, a desired transmission ratio can be realized and the size of the individual gears is reduced at the same time, since the intermediate gear 139 is disposed between the oil pump drive gear 8a and the oil pump driven gear 8b.

[Embodiment 4]

Figure 7:
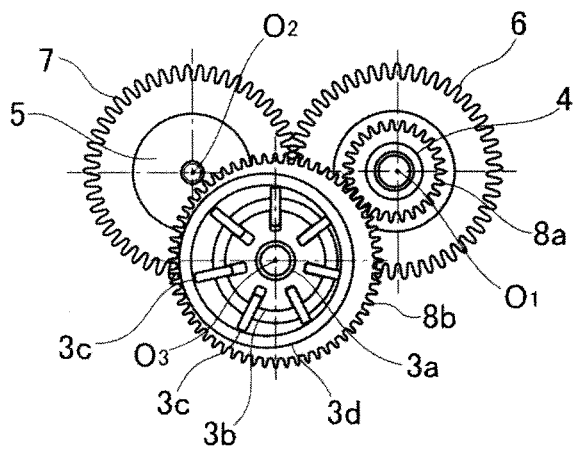
FIG. 7 is a front view of the drive balancer shaft 4, the driven balancer shaft 5 and the oil pump drive shaft 3a according to the fourth embodiment.

The fourth embodiment is now described only with respect to the points which are different from the first embodiment, since it has the same basic structure as the first embodiment. FIG. 7 is a front view of the drive balancer shaft 4, the driven balancer shaft 5 and the oil pump drive shaft 3a according to the fourth embodiment. According to the fourth embodiment, the oil pump drive gear 8a is provided on the drive balancer shaft 4.

According to the fourth embodiment, the following effects can be achieved.

(9) The balancer device for the internal combustion engine according to (1), wherein the drive mechanism 8 comprises an oil pump drive gear 8a provided on the drive balancer shaft 4 and the oil pump driven gear 8b engaged with the oil pump drive gear 8a.

Therefore, the space that is conventionally a dead space can be effectively utilized to arrange an oil pump drive gear 8a and the oil pump driven gear 8b, so that an increase in the axial dimension of the device can be suppressed. Moreover, it is possible to shorten the torque transmission path length leading to the oil pump driven gear 8b from the drive unit 2, so that a reduction in engagement noise between the oil pump drive gear 8a and the oil pump driven gear 8b can be realized. Furthermore, the gears 6, 7, 8a, 8b are aggregated in one place, so that the number of the partition walls necessary for the lower housing 108 can be reduced and weight reduction of the device can be realized.

[Embodiment 5]

Figure 8:
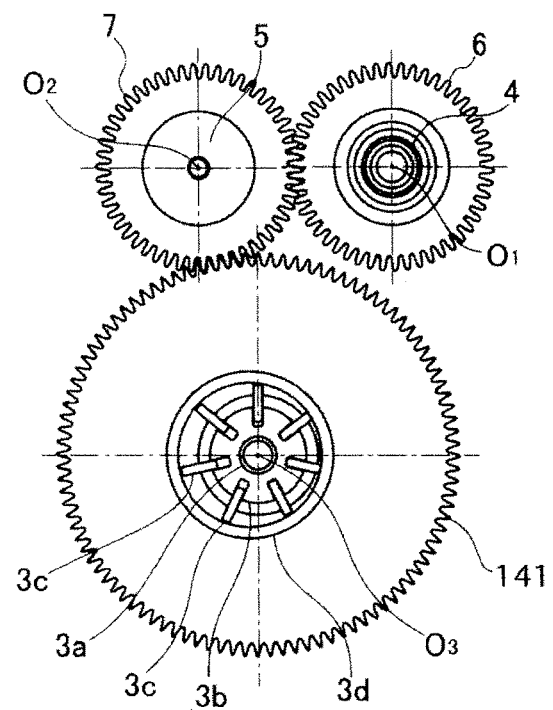
FIG. 8 is a front view of the drive balancer shaft 4, the driven balancer shaft 5 and the oil pump drive shaft 3a according to the fifth embodiment.

The fifth embodiment is now described only with respect to the points which are different from the first embodiment, since it has the same basic structure as the first embodiment. FIG. 8 is a front view of the drive balancer shaft 4, the driven balancer shaft 5 and the oil pump drive shaft 3a according to the fifth embodiment. In the fifth embodiment, an oil pump gear 141 as a drive mechanism engages with the balancer driven gear 7. The oil pump drive shaft 3a is press-fitted into the oil pump gear 141. The teeth number of the oil pump gear 141 is set to be twice the teeth number of the balancer driven gear 7. In the fifth embodiment, one oil pump gear 141 is used as the drive mechanism and the number of gears constituting the drive mechanism is limited to a minimum, so that an increase in the number of components can be suppressed.

[Embodiment 6]

Figure 9:
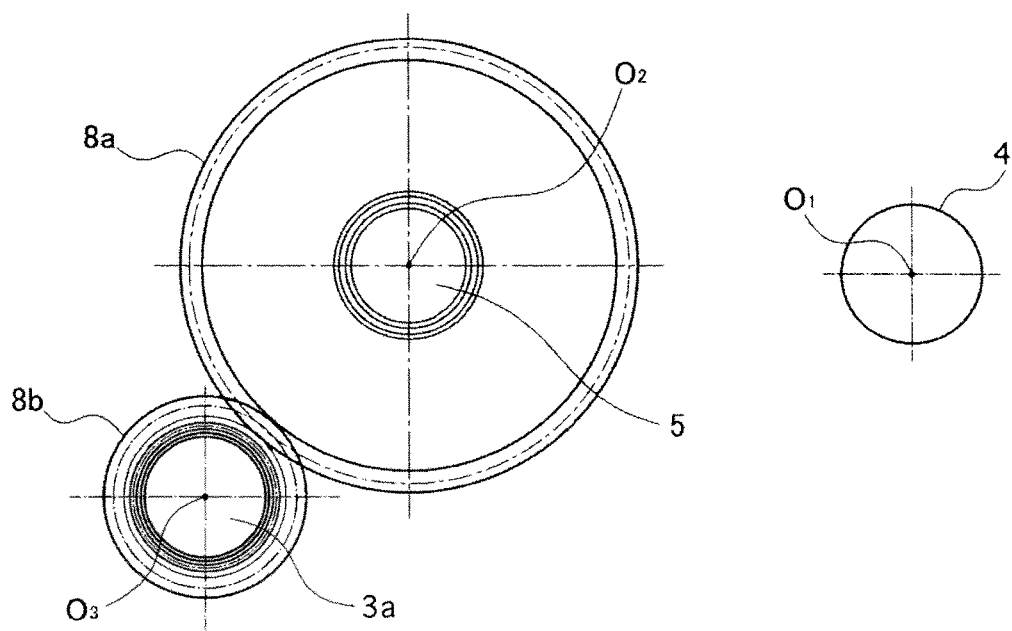
FIG. 9 is a schematic front view of the drive balancer shaft 4, the driven balancer shaft 5 and the oil pump drive shaft 3a according to the sixth embodiment.

The sixth embodiment is now described only with respect to the points which are different from the first embodiment, since it has the same basic structure as the first embodiment. FIG. 9 is a schematic front view of the drive balancer shaft 4, the driven balancer shaft 5, and the oil pump drive shaft 3a according to the sixth embodiment. In the sixth embodiment, a common fixed displacement trochoid pump is used as the oil pump 3. The teeth number $N_A$ of the oil pump drive gear 8a is set to be twice the teeth number $N_B$ of the oil pump driven gear 8b. Thereby, the rotational speed of the oil pump drive shaft 3a is doubled with respect to the rotational speed of the driven balancer shaft 5. Thus, an increased rotational speed of the oil pump 3 can be realized, so that the size reduction can be prompted by use of an oil pump with high rotational speed.

[Other Embodiments]

Although the detailed description of the invention has been described based on the foregoing embodiments for carrying out the invention, the specific configurations of the invention are not limited to those described in the embodiments. Configurations with design changes, etc within the scope of the gist of the invention are also included in the invention.

For example, the oil pump drive gear and the oil pump driven gear can have the same teeth number. A plurality of intermediate gears can be provided between the oil pump drive gear and the oil pump driven gear.

The following describes technical ideas other than the inventions derived from the foregoing embodiments and described in the claims.

(7) The balancer device for the internal combustion engine according to (2), wherein the teeth number of the oil pump drive gear and the oil pump driven gear is represented as $N_A$, $N_B$, respectively, and the following expression:

$$N_A < N_B$$

is satisfied.

Therefore, a reduced rotational speed of the oil pump can be realized.

(8) The balancer device for the internal combustion engine according to (2), wherein the teeth number of the oil pump drive gear and the oil pump driven gear is represented as $N_A$, $N_B$, respectively, and the following expression:

$$N_A \geq N_B$$

is satisfied.

Therefore, a constant or an increased rotational speed of the oil pump can be realized.

(10) The balancer device for the internal combustion engine according to (1), wherein the drive mechanism comprises:
an oil pump drive gear provided on the driven balancer shaft,
an intermediate gear engaged with the oil pump drive gear, and
an oil pump driven gear engaged with the intermediate gear.

Therefore, a desired transmission ratio can be realized and the size reduction of the individual gears is achieved at the same time by use of the intermediate gear.

(11) The balancer device for the internal combustion engine according to (1), wherein the drive mechanism comprises an oil pump gear engaged with the balancer drive gear or the balancer driven gear.

Therefore, the number of gears constituting the drive mechanism is limited to a minimum, so that an increase in the number of components can be suppressed.

(12) The balancer device for the internal combustion engine according to (1), wherein a helical gear is used for the gear.

Therefore, it is possible to realize quietness in spite of a high speed and high load.

(13) The balancer device for the internal combustion engine according to (1), wherein the rotational force is transmitted to the drive unit through a chain.

Therefore, the rotational speed of the crankshaft can be changed and transmitted to the drive balancer shaft located at a distance. A chain drive is advantageous in size reduction as compared to a gear drive.

(14) The balancer device for the internal combustion engine according to (1), wherein the oil pump is a variable displacement oil pump for varying the amount of the volume change in the pump chamber in response to a predetermined state.

Therefore, it is possible to reduce the amount of the volume change in the pump chamber at the time of high rotational speed. The discharge flow rate at high rotational speed of the engine can be suppressed and an improvement in fuel consumption can be realized.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2015-040946 filed on Mar. 3, 2015. The entire disclosures of No. 2015-040946 filed on Mar. 3, 2015 including specification, claims, drawings and summary are incorporated herein by reference in its entirety.

What is claimed is:

1. A balancer device comprising: a drive unit to which a rotational force is transmitted from a crankshaft, a drive balancer shaft having a drive balancer weight rotated integrally with the drive unit, a balancer drive gear arranged on a same side as the drive unit with reference to a position of the drive balancer weight in an axial direction of the drive balancer shaft, and rotated integrally with the drive balancer shaft, a balancer driven gear structured to engage with the balancer drive gear, a driven balancer shaft rotated integrally with the balancer driven gear and having a driven balancer weight provided on a same side as the drive balancer weight in an axial direction of the driven balancer shaft, a drive mechanism having a gear on the side opposite to the driven balancer weight in the axial direction of the driven balancer shaft, wherein the rotational force is transmitted to the drive mechanism from one of the balancer shafts, and an oil pump including an oil pump drive shaft driven through the drive mechanism, wherein a rotational center of the oil pump drive shaft is located between a second virtual line and a third virtual line, the second virtual line passing through a rotational center of the drive balancer shaft and being perpendicular to a first virtual line connecting the rotational center of the drive balancer shaft and a rotational center of the driven balancer shaft, and the third virtual line passing through the rotational center of the driven balancer shaft and being perpendicular to the first virtual line, when the drive balancer shaft, the driven balancer shaft, and the oil pump drive shaft are viewed in a plane perpendicular to rotational axes of the drive balancer shaft, the driven balancer shaft, and the oil pump drive shaft, and wherein an axial length of the driven balancer shaft is shorter than an axial length of the drive balancer shaft.

2. The balancer device for the internal combustion engine according to claim 1, wherein the drive mechanism comprises:
an oil pump drive gear provided on the driven balancer shaft, and
an oil pump driven gear structured to engage with the oil pump drive gear.

3. The balancer device for the internal combustion engine according to claim 2, wherein the oil pump driven gear is provided on the side of the drive balancer shaft in a direction perpendicular to the axis of the driven balancer shaft.

4. The balancer device for the internal combustion engine according to claim 3, wherein the oil pump drive shaft is provided on the oil pump driven gear and rotated integrally with the oil pump driven gear, and the oil pump drive shaft is disposed between the drive balancer shaft and driven balancer shaft in a direction perpendicular to the axis of the drive balancer shaft.

5. The balancer device for the internal combustion engine according to claim 4, wherein the oil pump is disposed between the drive unit and the oil pump driven gear in the axial direction of the drive balancer shaft.

6. The balancer device for the internal combustion engine according to claim 2, wherein the oil pump driven gear is provided on the side opposite to the drive balancer shaft in a direction perpendicular to the driven balancer shaft.

7. The balancer device for the internal combustion engine according to claim 2, wherein a number of teeth of the oil pump drive gear and the oil pump driven gear is represented as NA, NB, respectively, and the following expression:

$$NA < NB$$

is satisfied.

8. The balancer device for the internal combustion engine according to claim 2, wherein a number of teeth of the oil pump drive gear and the oil pump driven gear is represented as NA, NB, respectively, and the following expression:

$$NA \geq NB$$

is satisfied.

9. The balancer device for the internal combustion engine according to claim 1, wherein the drive mechanism comprises:
an oil pump drive gear provided on the drive balancer shaft, and an oil pump driven gear structured to engage with the oil pump drive gear.

10. The balancer device for the internal combustion engine according to claim 1, wherein the drive mechanism comprises:
an oil pump drive gear provided on the driven balancer shaft, and
an intermediate gear structured to engage with the oil pump drive gear, and an oil pump driven gear structured to engage with the intermediate gear.

11. The balancer device for the internal combustion engine according to claim 1, wherein the drive mechanism comprises an oil pump gear structured to engage with the balancer drive gear or the balancer driven gear.

12. The balancer device for the internal combustion engine according to claim 1, wherein the gear of at least the drive mechanism comprises a helical gear.

13. The balancer device for the internal combustion engine according to claim 1, wherein the rotational force is transmitted to the drive unit through a chain.

14. The balancer device for the internal combustion engine according to claim 1, wherein the oil pump is a variable displacement oil pump configured to vary an amount of a volume change in a pump chamber in response to a predetermined state.

15. A balancer device for an internal combustion engine comprising: a housing attached to the internal combustion engine, a drive balancer shaft rotationally received in the housing and having a drive balancer weight, a chain drive unit provided on one end of the drive balancer shaft, wherein a rotational force is transmitted to the chain drive unit from the crankshaft through a drive chain, a balancer drive gear provided between the drive balancer weight and the chain drive unit in an axial direction of the drive balancer shaft and rotated integrally with the drive balancer shaft, a balancer driven gear structured to engage with the balancer drive gear, a driven balancer shaft rotated integrally with the balancer driven gear, wherein the driven balancer shaft is received in the housing and has a driven balancer weight provided on the same side as the drive balancer weight in an axial direction of the driven balancer shaft, an oil pump drive gear provided on the side opposite to the driven balancer weight in the axial direction of the driven balancer shaft and rotated integrally with the driven balancer shaft, an oil pump driven gear structured to engage with the oil pump drive gear, and an oil pump driven by the oil pump driven gear and including an oil pump drive shaft, wherein a rotational center of the oil pump drive shaft is located between a second virtual line and a third virtual line, the second virtual line passing through a rotational center of the drive balancer shaft and being perpendicular to a first virtual line connecting the rotational center of the drive balancer shaft and a rotational center of the driven balancer shaft, and the third virtual line passing through the rotational center of the driven balancer shaft and being perpendicular to the first virtual line, when the drive balancer shaft, the driven balancer shaft, and the oil pump drive shaft are viewed in a plane perpendicular to rotational axes of the drive balancer shaft, the driven balancer shaft, and the oil pump drive shaft, and wherein the oil pump drive gear is arranged on a side of a first end of the driven balancer shaft with respect to the balancer driven gear in the axial direction of the driven balancer shaft, and the oil pump is disposed between the chain drive unit and the oil pump driven gear in the axial direction of the drive balancer shaft.

16. The balancer device for the internal combustion engine, according to claim 15, wherein the oil pump is attached to the housing.

17. A balancer device comprising: a drive unit to which a rotational force is transmitted from a crankshaft, a drive balancer shaft having a drive balancer weight rotated integrally with the drive unit, a balancer drive gear arranged on a same side as the drive unit with reference to a position of the drive balancer weight in an axial direction of the drive balancer shaft, and rotated integrally with the drive balancer shaft, a balancer driven gear structured to engage with the balancer drive gear, a driven balancer shaft rotated integrally with the balancer driven gear and having a driven balancer weight provided on a same side as the drive balancer weight in an axial direction of the driven balancer shaft, a drive mechanism having a gear on the side opposite to the driven balancer weight in the axial direction of the driven balancer shaft, wherein the rotational force is transmitted to the drive mechanism from one of the balancer shafts, and an oil pump including an oil pump drive shaft driven through the drive mechanism, wherein a rotational center of the oil pump drive shaft is located between a second virtual line and a third virtual line, the second virtual line passing through a rotational center of the drive balancer shaft and being perpendicular to a first virtual line connecting the rotational center of the drive balancer shaft and a rotational center of the driven balancer shaft, and the third virtual line passing through the rotational center of the driven balancer shaft and being perpendicular to the first virtual line, when the drive balancer shaft, the driven balancer shaft, and the oil pump drive shaft are viewed in a plane perpendicular to rotational axes of the drive balancer shaft, the driven balancer shaft, and the oil pump drive shaft, and wherein the rotational center of the oil pump drive shaft is arranged below the rotational center of the drive balancer shaft and the rotational center of the driven balancer shaft in a vertical direction.

* * * * *